(12) United States Patent
Nayak et al.

(10) Patent No.: US 7,376,642 B2
(45) Date of Patent: May 20, 2008

(54) INTEGRATED FULL TEXT SEARCH SYSTEM AND METHOD

(75) Inventors: Tapas Kumar Nayak, Sammamish, WA (US); Nimish Khanolkar, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 382 days.

(21) Appl. No.: 10/813,312

(22) Filed: Mar. 30, 2004

(65) Prior Publication Data

US 2005/0222975 A1    Oct. 6, 2005

(51) Int. Cl.
*G06F 17/30* (2006.01)
(52) U.S. Cl. .................. 707/3; 707/5; 707/10
(58) Field of Classification Search ............... 707/2–5, 707/10, 102; 709/203; 701/500
See application file for complete search history.

(56) References Cited

U.S. PATENT DOCUMENTS

| | | | |
|---|---|---|---|
| 5,799,310 A | | 8/1998 | Anderson et al. |
| 5,802,518 A * | | 9/1998 | Karaev et al. ................ 707/9 |
| 6,047,291 A | | 4/2000 | Anderson et al. |
| 6,078,925 A | | 6/2000 | Anderson et al. |
| 6,199,081 B1 * | | 3/2001 | Meyerzon et al. .......... 715/513 |
| 6,665,640 B1 * | | 12/2003 | Bennett et al. .............. 704/257 |
| 7,054,855 B2 * | | 5/2006 | Basso et al. ................... 707/3 |
| 2005/0131866 A1 * | | 6/2005 | Badros et al. ................. 707/3 |

OTHER PUBLICATIONS

I.H. Witten, C.G. Nevill-Manning, and S.J. Cunningham. Building a digital library for computer science research: technical issues. In Proc. Australasian Computer Science Conference, pp. 534-542, 1996.
G.E. Blake, M.P. Consens, P. Kilpelainen, P-. Larson, T. Snider, and F.W. Tompa. Text/Relational Database Management Systems: Harmonizing SQL and SGML. In Proc. Application of Databases, 1994. 14 pages.
Jim Melton and Andrew Eisneberg. SQL Multimedia and Application Packages(SQL/MM). ACM SIGMOD Record, vol. 30 Issue 4, pp. 97-102, 2001.

* cited by examiner

*Primary Examiner*—Cheryl Lewis
(74) *Attorney, Agent, or Firm*—Amin, Turocy & Calvin, LLP

(57) ABSTRACT

The present invention relates to an integrated full-text search architecture that integrates full text search with database server applications in a tight manner so that it becomes part of the server in all aspects including storage, metadata, query processing, back/up restore and resource management. This provides improved performance with respect to queries as well as improved manageability. Furthermore, the subject architecture is open and schema directed unlike other conventional full-text search architectures. Accordingly, the full-text search architecture enables expert users (e.g., search providers) to define their own index structures as well as ranking algorithms.

30 Claims, 15 Drawing Sheets

INTEGRATED FULL TEXT SEARCH SYSTEM AND METHOD

TECHNICAL FIELD

The present invention relates generally to computers and more particularly toward full-text search systems as well as database management systems.

BACKGROUND

Full-text searching of unstructured and semi-structured data is becoming increasingly popular and significant in the computing world. For many years, the information-retrieval community has had to deal with the storage of documents and with the retrieval of documents based on one or more keywords. Since the burgeoning of the Internet and the feasibility of storing documents on-line, retrieval of documents based on keywords has become a complex problem. A myriad of software solutions have been developed, which have attempted to address this problem.

Conventional search engines provide a mechanism for searching unstructured as well as semi-structured data, however they are all nonspecific and search algorithms as well as schema are hard coded. Many of the most popular search engines such as Google® and Yahoo® are targeted toward processing generic queries over an almost infinite domain—the Internet. The search and ranking algorithms employed by such search engines are static and unchanging with respect to received queries. Hence, these search engines will utilize the same algorithms regardless of whether the majority of searches correspond to specialized areas or scenarios such as medicine, law, and e-business, for instance. The relevance of returned results could be dramatically increased if the query algorithms were targeted at a particular domain of interest. Conventionally, however, query algorithms are hard coded into search engines and securely protected as company trade secrets. Accordingly, if an individual or entity would like to add extra information or features to a conventional search engine targeted at a particular domain, for instance, they would need to attempt to build an auxiliary application external to the search engine, which most likely would not produce the desired results. Alternatively, an individual or entity could attempt to build their own search engine or solicit a software company to do it for them. Unfortunately, either choice would most likely be prohibitively expensive both in terms of time and money.

A large portion of digitally stored information is presently stored in the form of unstructured textual data, both in plain text files and in formatted documents. Although the bulk of this textual data is stored in file systems, there are advantages to storing such data in databases (e.g., relational, multidimensional). By doing so, the advantages of a database, including high-performance access, query capability, metadata based queries, simple application-based user interfaces for end users, and secure remote access, are made available.

Database management systems (DBMSs) such as SQL Server are widely used to search structured data. It is impractical, however, to search unstructured data (e.g., text documents) the same way structured data is searched in part because doing so is too expensive. For example, in order to retrieve information from structured data in a database, a user typically provides a query (written in a query language such as SQL), where the query specifies the structured information to be retrieved (the search term or terms), the field in which the search term is to be found and the manner in which the retrieved information is to be manipulated or evaluated in order to provide a useful result, which is typically a relational operator or a function. To process the query, the database system typically converts the query into a relational expression that describes algebraically the result specified by the query. The relational expression is used to produce an execution plan, which describes particular steps to be taken by a computer to produce the requested result. Because the search term and the field where the search term is sought are specified, such results can be returned quickly. Moreover, indexes based on key fields (e.g., an index based on name or social security number for a personnel database) routinely assist in efficient searching.

A similarly conducted search for the same search term in unstructured data would require a word-by-word search of the entire text database and is simply unworkable and impractical. Conventional solutions to this problem typically involve the creation of an inverted index for searching documents by building a custom data structure external to the database system before a search query is entered. These solutions usually involve pulling data out of the database via bridges or gateways and storing the data as files in the file system so that textual indexing can be applied. Some other conventional systems actually store index data in a database but use an external engine to build and query the index. This approach does not provide a seamless way for a user to combine a textual query with a regular structured relational query and limits the extent to which a query can be optimized.

Although full-text searching is frequently a capability of database management systems, the conventional implementation of full-text search is unable to take advantage of the features of the database management system. Database management systems are generally unable to accommodate full-text searching of documents within the structure of the database because the full-text capabilities are only loosely coupled therewith. For instance, typically, the index created to search a document database is not itself part of the database system (i.e., is separate from the database's index system). Because the index created is not part of the database system, certain limitations arise and certain highly advantageous aspects of database systems do not apply to typical full-text search systems.

Accordingly, there is a need in the art for a full-text search system that can employ separately provided index schemas and ranking algorithms to efficiently generate relevant results for targeted domains. Furthermore, there is a need for a full-text search system that can be tightly integrated with a database management system to, inter alia, leverage the highly optimized and advantageous features thereof.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for an open and generic full-text search architecture that can be utilized to build custom search systems for specific areas and/or scenarios. In particular the present system is adapted to receive third party developer plug-in components. Such components can specify an index schema, a method of populating the index schema, and particulars as to the manner in which a query is executed (e.g., ranking algorithms), among other things. Of course, the subject invention can also provide for default schemas and query actions in the absence of direction by customized plug-in components.

According to another aspect of the invention, unstructured full-text search functionality can be tightly integrated into a database management system, such as SQL Server. In essence, the present invention integrates full-text search into a database management system in such a manner that it becomes part of the system in all aspects including storage, metadata, query processing, backup/restore, and resource management. This provides unprecedented improvement in query execution performance and also provides enhanced manageability.

The fully integrated and open system and method provided by the subject invention represents a new direction in full-text search technology. With this innovative framework comes a system on which vendors in vertical segments can build their own specific solutions with their own domain specific index and ranking algorithms implemented as middle tier. This allows such middle tier applications to add a lot more value then they are currently able to provide given that ranking algorithms are conventionally completely hard coded inside servers. Furthermore, tight integration with the query optimizer of the database management system allows developers to choose the proper tradeoff between performance and relevance within a particular application domain. Still further yet, integrated manageability makes administration of full-text searches much simpler.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

The foregoing and other aspects of the invention will become apparent from the following detailed description and the appended drawings described in brief hereinafter.

DETAILED DESCRIPTION

The present invention is now described with reference to the annexed drawings, wherein like numerals refer to like elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The term "document" as used herein should be interpreted broadly and can include but is not limited to character strings, tables, text files, program files, schemas, multimedia files, web pages, links and the like. Accordingly, a document can be of any type such as Word, WordPerfect, PowerPoint, Excel, PDF, HTML, and XML.

Furthermore, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. For example, a computer readable media can include but is not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope or spirit of the subject invention.

Figure 1:
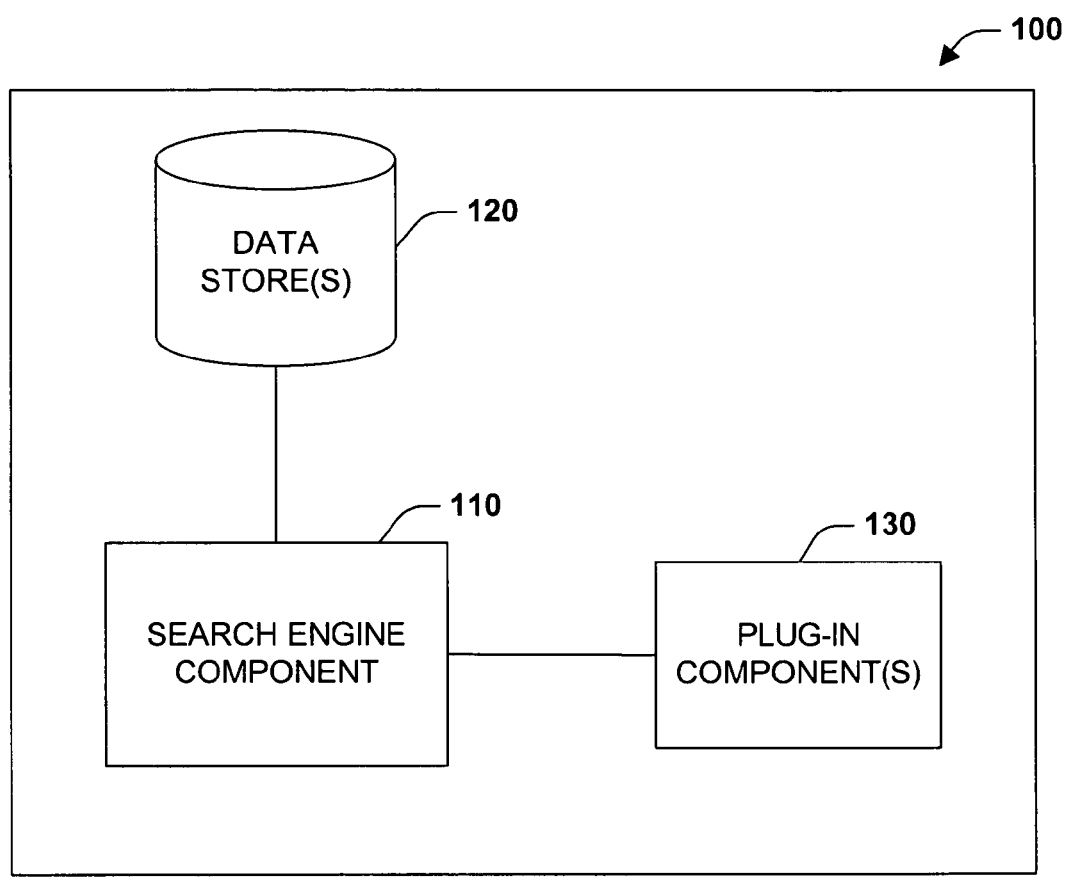
FIG. 1 is a schematic block diagram of a search system in accordance with an aspect of the present invention.

Turning initially to FIG. 1, a search system 100 is illustrated in accordance with an aspect of the present invention. Search system 100 comprises search component 110, data store(s) 120, and plug-in component(s) 130. Search engine component 110 provides a mechanism for locating and retrieving data from one or more data stores 120. Data store(s) 120 can be located proximate to or remote from the search engine component 110. Search engine component 110 can utilize one or more user-supplied keywords or phrases to search through documents residing on the data store(s) 130 and return a list of documents that contain the specified keywords or phrases. To facilitate rapid retrieval of documents, search engine system 110 can generate one or more indexes summarizing words contained in a document for purposes of matching keywords or phrases thereto. Furthermore, a ranking or relevance algorithm can be employed to facilitate ranking matching documents and providing a list of documents to a user in order of their relevance. The search engine component 110 can receive/retrieve information regarding indexes and relevance algorithms from plug-in component(s) 130 provided by users. Plug-in component(s) 130 can define the schema of an index, how the schema is to be populated and a relevance methodology based on the associated schema. Plug-in component(s) 130, therefore, enables expert users (e.g., search providers) to define their own index structures and ranking algorithms, inter alia, rather than forcing them to cope with secret-proprietary structures and algorithms. The open architecture of the present invention will thereby create a market for plug-in components for specific environments and scenarios (e.g., medicine, law, geology, product catalogs, finance, customer information . . . ) as well as promote advancement of general full-text search indexes and algorithms. Furthermore, according to an aspect of the present invention search system components can be tightly integrated within a database management system (e.g., SQL Server) database engine and associated query optimizer. Hence, the present system can allow developers to choose the right tradeoff between performance and relevance for a particular application domain. It should also be noted that such integrated manageability also makes administration a lot easier.

Figure 2:
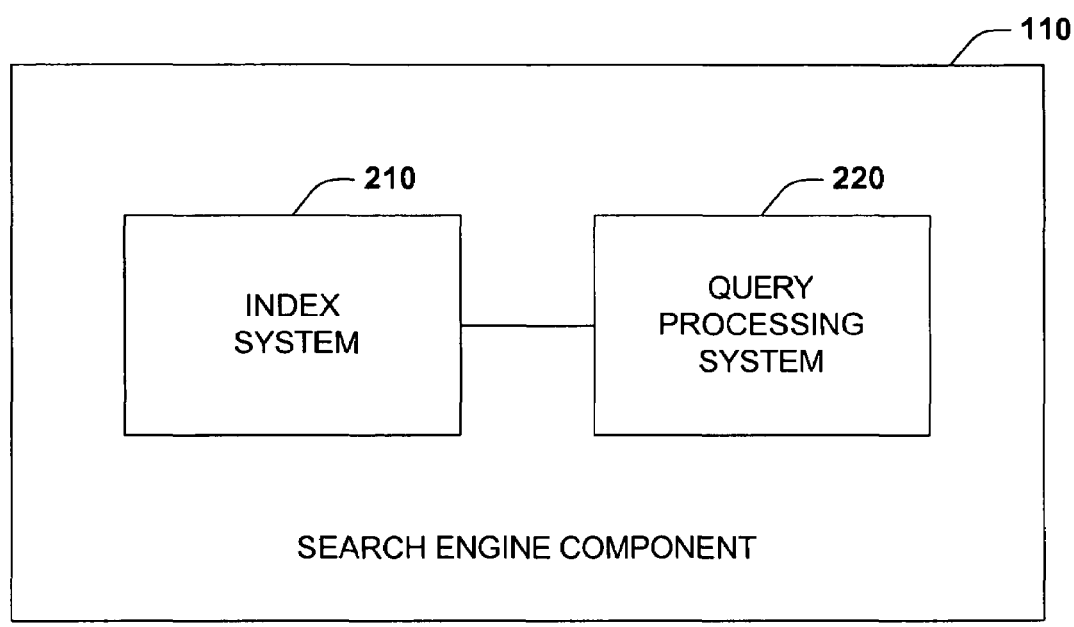
FIG. 2 is a schematic block diagram of a search engine component in accordance with an aspect of the present invention.

Turning to FIG. 2 a search engine component 110 is illustrated in further detail in accordance with an aspect of the present invention. The search engine component 110 includes an index system 210 and a query processing system 220. Index system 220 provides a means for indexing the content of documents. According to an aspect of the present invention, indexes can be built and stored utilizing standard database technology (e.g., SQL Server storage and query engine). Furthermore, indexes can be defined by plug-in components specified by third party developers. Generally speaking, however, indexes can be compressed structures which include document identifiers as well as the number of occurrences of keywords in a particular documents, among other things. Additionally, it should be appreciated that the subject invention can comprise a default or out of box index schema that can be utilized until and unless a custom schema is provided to the system. The query processing system 220 accepts queries and returns results based in part upon one or more indexes generated by the index system 210 and a relevance algorithm. The index facilitates faster processing and sorting of documents by the query processing system 220.

Figure 3:
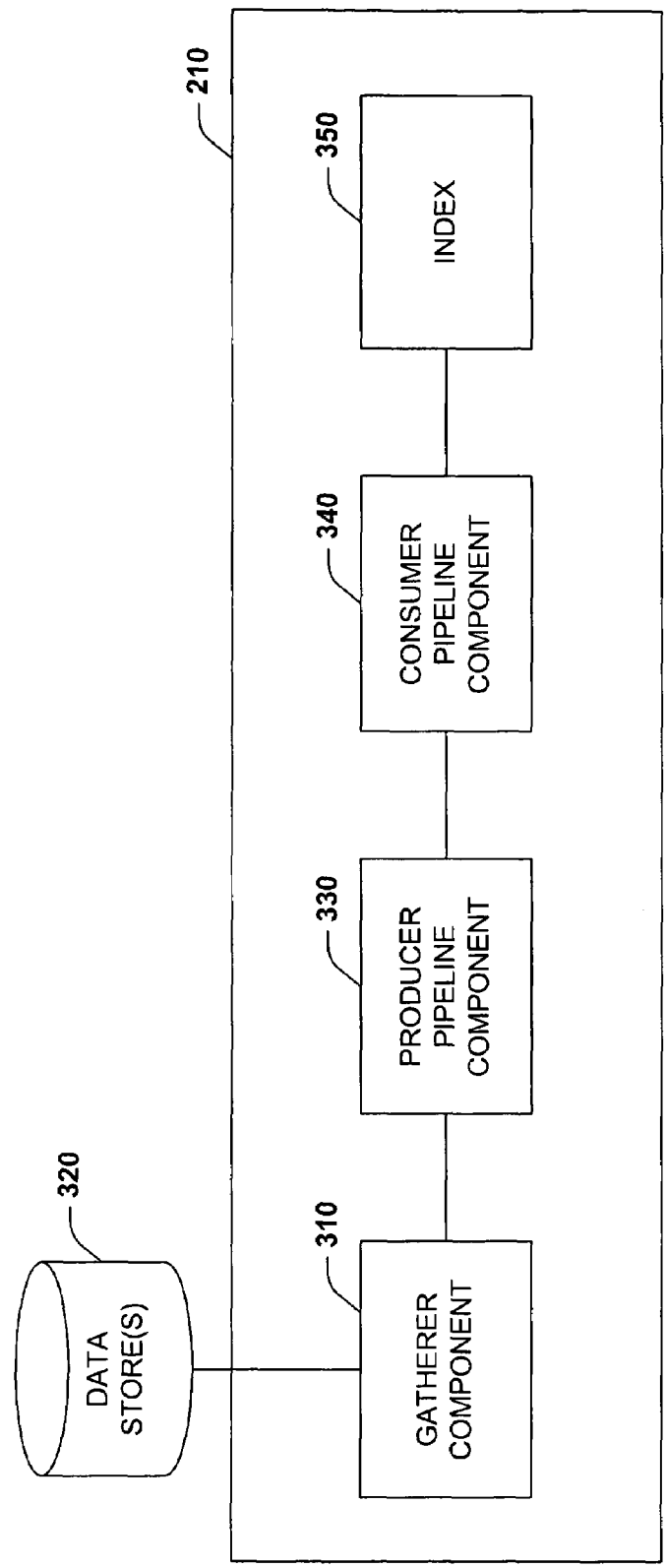
FIG. 3 is a schematic block diagram of an index system in accordance with an aspect of the present invention.

FIG. 3 depicts an index system 210 in accordance with an aspect of the subject invention. Index system 210 includes a gatherer component 310, a producer pipeline component 330, consumer pipeline component 340, and index data structure 350. Gatherer component 310 can retrieve a document either directly from a data store 320 or indirectly from external data stores via a uniform resource locator or some other locator mechanism. The document data can then be provided to or retrieved by producer pipeline component 330. The producer pipeline component 330 parses document structure and text. Furthermore the producer pipeline component 330 can add information to document data flows or streams (e.g., derived or mined) and/or create new data streams. The consumer pipeline component 340 can retrieve or receive data streams from producer pipeline component 330. Upon receipt of data, consumer pipeline component 340 can consume the provided information and take some action. For example, as the consumer pipeline component 340 consumes information it can either persist information to some persistence structure (e.g., table, compressed relation, transacted persisted store) or the consumer pipeline component 340 can execute some other action in a transacted manner (e.g., send a message through transacted message queues). In the subject system 210, the data can be word-broken and stored in an index structure 350. According to an aspect of the invention, the index structure 350 can be an inverted compressed index as describe in further detail in a later section. Furthermore and in accordance with an aspect of the present invention, producer pipeline component can be executed separately as a daemon process to ensure efficient and stable operation of the database management system. However, it should be appreciated that the producer pipeline component 330 and the consumer pipeline component 340 can be combined and executed together as a single component.

Figure 4:
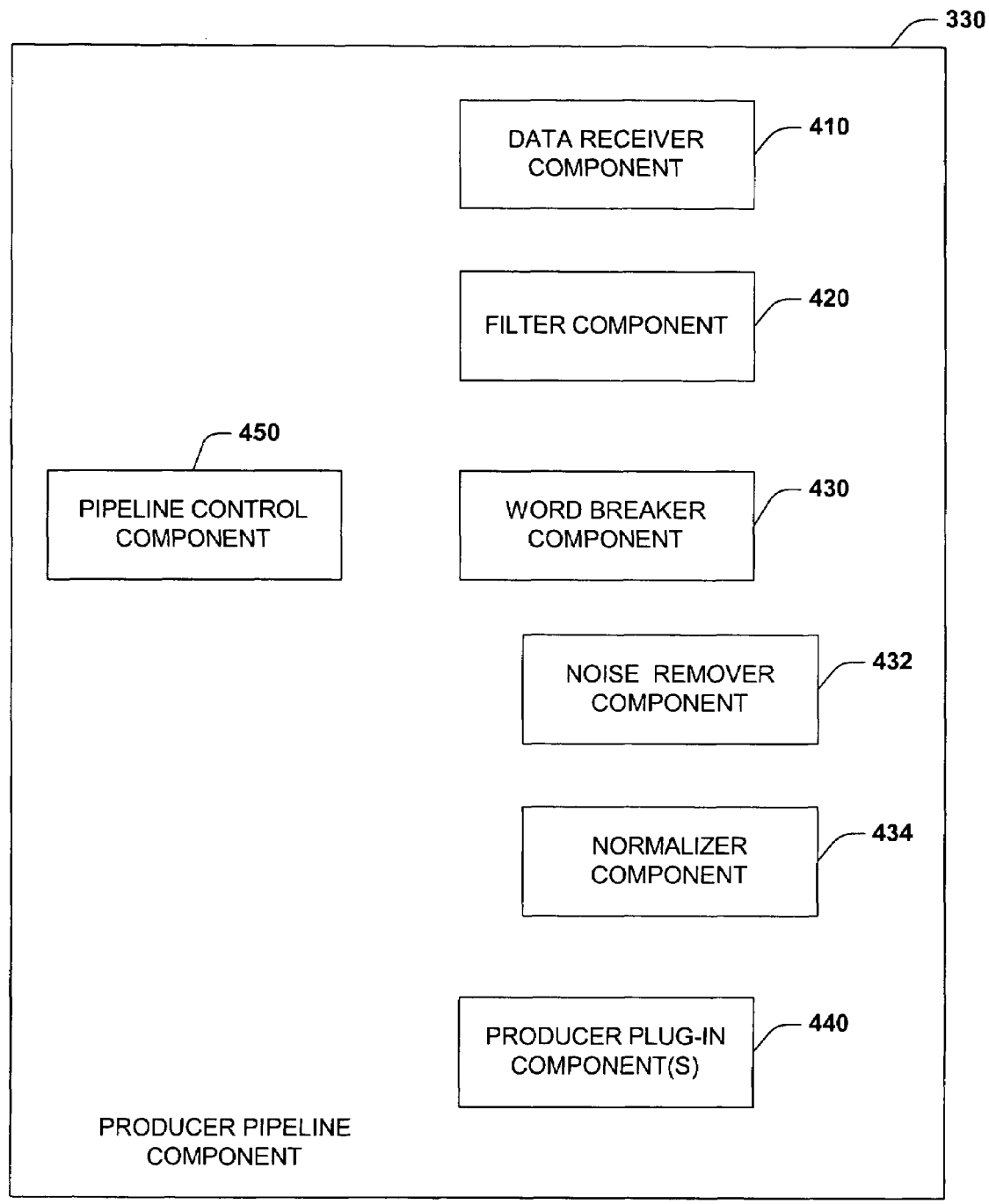
FIG. 4 is a schematic block diagram of a producer pipeline component in accordance with an aspect of the subject invention.

Turning to FIG. 4, a producer pipeline component 330 is illustrated in further detail in accordance with an aspect of the subject invention. As shown, producer pipeline component 330 comprises data receiver component 410, filter component 420, word-breaker component 430, noise remover component 432, normalizer component 434, producer plug-in component(s) 440, and pipeline controller component 450. The data receiver component receives or retrieves data streams for processing by the producer pipeline component 330. For example, the data receiver component can receive data directly from a gathering component 310 (FIG. 3) or indirectly through a pool of shared memory segments. Once data has been introduced into the producer pipeline component 330 a multitude of components can proceed to process such data. For purposes of clarity, it is helpful to view data in the producer pipeline component 330 as pipes carrying data streams that are exposed to pipeline components for processing or manipulation. Accordingly, the present invention supports one or more of streams of data in shared memory that can be accessed by pipeline components or plug-ins. One such pipeline component can be filter component 420. Filter component 420 can access exposed data streams and filter out or remove structural or formatting data provided by a document. In other words, the filter component 420 parses the structure of the document and emits chunks of text. Additionally, it should be appreciated that the filter component 420 can also identify the language (e.g., English, French, German . . . ) associated with each text chunk and generate a language id. Word breaker component 430 can receive the text chunks and language id produced by the filer component 420 and parses the text and emits tokens corresponding to elements of a language grammar (e.g., keywords). In addition the word breaker component 430 can also determine the location keywords in a document. For instance, keyword location can be specified as the position of the key word in the document (e.g., first word, second word, third word . . . ). Alternatively, keyword location can be specified specify as a number representing the byte offset from the beginning of the document. Noise remover component 432 can perform additional processing on a data stream to remove "noise words." That is, words with little value as search criteria (e.g., a, an, the . . . ). Still further processing can be performed via normalizer component 434. Normalizer component 434 can normalize a document for case and diacritical marks prior to indexing. For instance, if a developer does not want a query to be accent sensitive, the normalizer component can strip all words of accents (e.g., café becomes cafe). What have been described thus far with respect to the producer pipeline have been default components that may be utilized in part to generate a default index for searching if one is not provided for by a third party. Producer plug-in component(s) 440 can provide a mechanism for third party developers to influence the manner in which data streams are processed. For example, developers can employ producer plug-in components 440 to update or modify data streams or alternatively add new data streams, as they so desire.

Producer pipeline component 330 can also comprise a pipeline control component 450. Accordingly to an aspect of the invention, the producer pipeline can be executed as an external or daemon process. Third party unmanaged code in the form of producer plug-in components 440 can often error, crash, and/or hang among other things. Thus, according to one embodiment of the present invention the producer pipeline can be executed separate from the other processes. The control component 450 can provide a means for interacting with producer pipeline data streams. In particular, the control component 450 can be employed by an external host controller to kill, stop, and/or restart producer pipeline processes.

Figure 5:
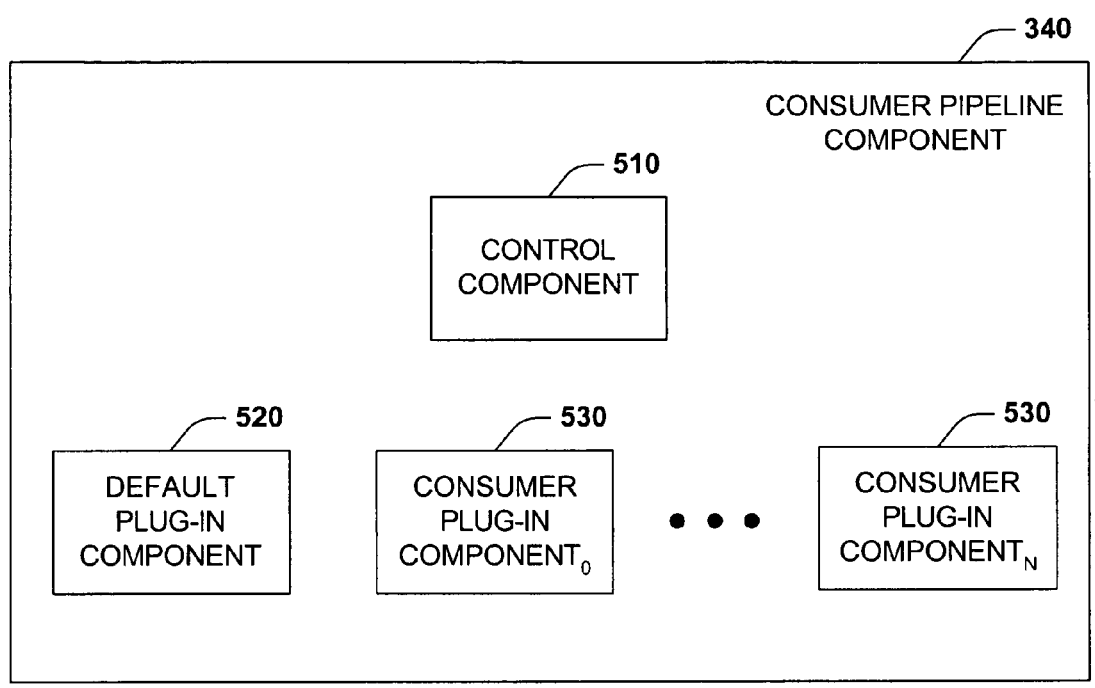
FIG. 5 is a schematic block diagram of a consumer pipeline component in accordance with an aspect of the present invention.

FIG. 5 depicts a consumer pipeline component 340 in accordance with an aspect of the present invention. The consumer pipeline component 340 can comprise a control component 510, a default plug-in component 520, and consumer plug-in components 530 (Consumer Plug-in Component$_0$ through Consumer Plug-in Component$_N$, where N is an integer greater than or equal to zero). Consumer plug-ins subscribe to one or more data streams produced and/or modified by one or more producer plug-ins. Consumer plug-ins can consume data streams and take actions (e.g., persisting data to a structure) unlike producer plug-ins that can merely modify and produce data streams. Control component 510 manages access of the consumer plug-in components to data streams. Default consumer plug-in component 520 is a system provided plug-in that generates one or more indexes from producer data steams. Default consumer plug-in can be utilized when a third party developer has failed to correctly specify one or more indexes. Consumer plug-in components 530 provide a mechanism for developers to construct indexes, inter alia. For example, consumer plug-in components 530 can also be utilized to process user subscriptions, such as news subscriptions.

Figure 6:
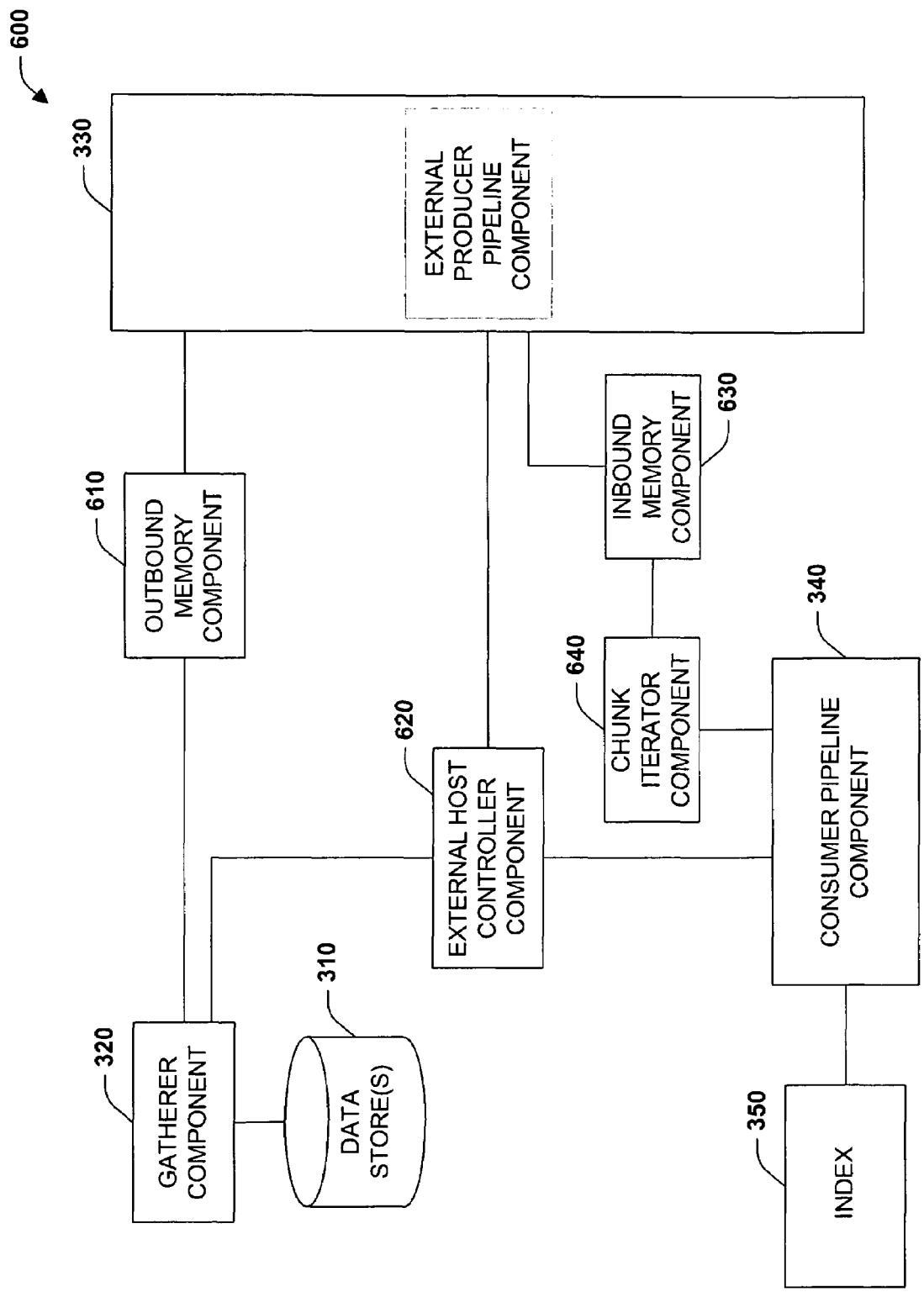
FIG. 6 is a schematic block diagram of an index system in accordance with an aspect of the subject invention.

Turning to FIG. 6 an index system 600 is illustrated in accordance with an aspect of the subject invention. Gatherer component 320 retrieves documents from data store(s) 310. It should be appreciated that gather component 320 can retrieve a document either directly from a data store 310 or indirectly from external data stores via a uniform resource locator or some other locator mechanism. Gather component 320 subsequently provides documents to outbound memory component 610. Outbound memory component 610 provides a buffer between the gatherer component 320 and the external producer pipeline component 330. Producer pipeline component 330 can then retrieve document data from outbound memory component 610 and generate data streams with particular schemas. External host component 620 can monitor and manage the external producer pipeline component 330 to ensure that the component is properly executing (e.g., not hanging or otherwise taking too much time). Inbound memory component 630 can receive data streams from the pipeline component 330 at the direction of the external host component 620. Chunk iterator component 640 can then retrieve data from the inbound memory component 630 and provide it in iterative chunks to the consumer pipeline component 340 for transaction execution. According to one aspect of the present invention, the consumer pipeline component 340 can produce an index 350 to be utilized for processing queries. The index can be an inverted compressed index data structure, for instance. Furthermore, it should be appreciated that the index can have data objects associated therewith, for example a table mapping document ids to database keys, to facilitate integration with a database management system.

Figure 7:
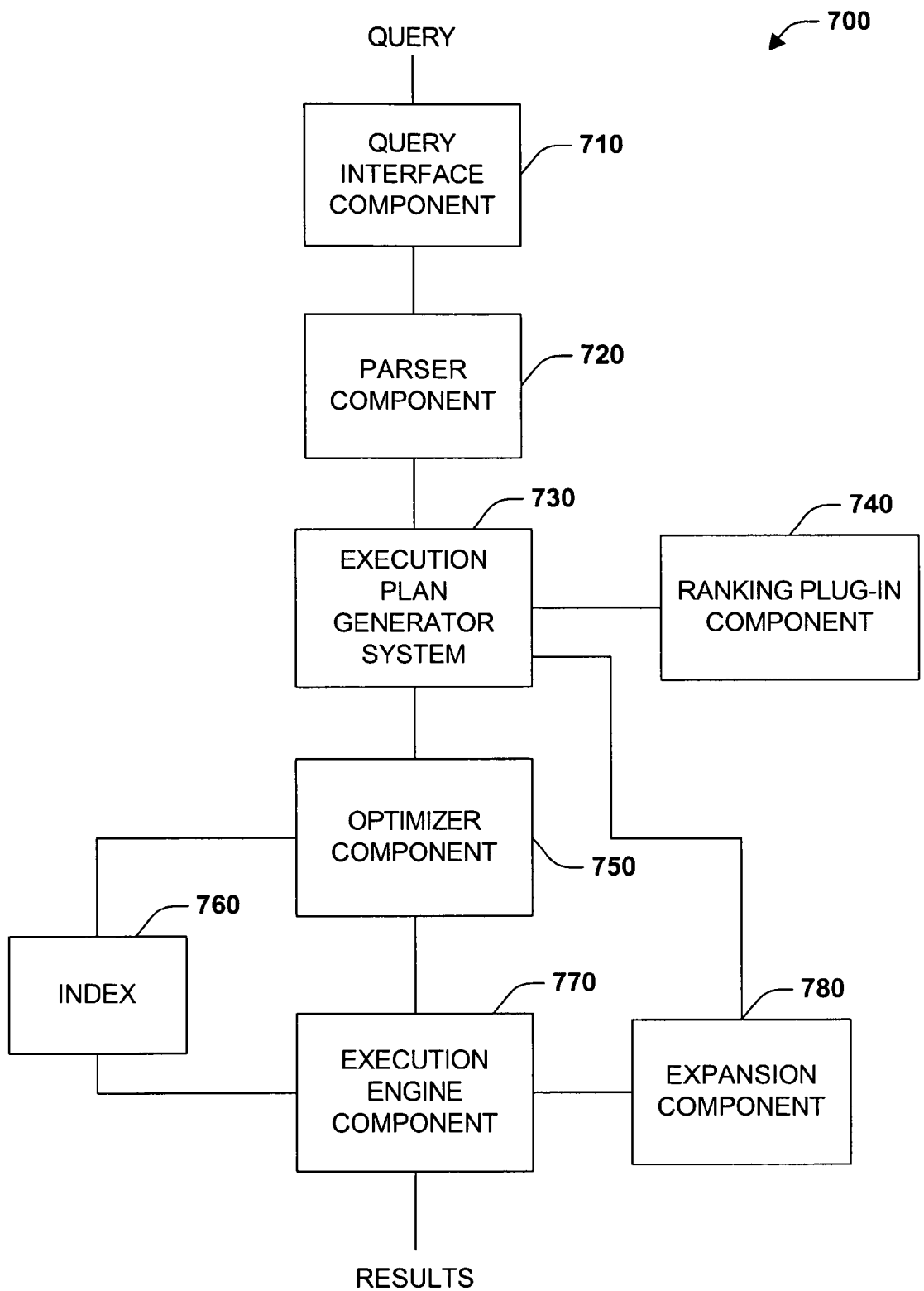
FIG. 7 is a schematic block diagram of a query processing system in accordance with an aspect of the subject invention.

Turning to FIG. 7, a query processing system 700 is depicted in accordance with an aspect of the present invention. Query processing system 700 comprises query interface component 710, parser component 720, execution plan generation system 730, ranking plug-in component 740, optimizer component 750, index 760, execution engine component 770, and expansion component 780. Query interface component 710 is adapted to receive a query from a user and provide the query to parser component 720. It should be appreciated that the entered query can be specified in a full text query format (e.g., default or as specified by third party developer) and/or a traditional relational query in SQL, for instance. Parser component 720 receives input from the query interface component 710 and parses the input query into tokens. Subsequently, execution plan generation system can utilize the parsed data to produce an integrated query plan. The integrated query plan can receive relevance or ranking function information from the ranking plug-in component 740. Such relevance information can be a default native system ranking or functions provided by a third party search developer. According to one aspect of the subject invention, a query tree including the parsed keyword inputs and relational prepositions can be generated by the execution plan generator 730. Subsequently, ranking functions (e.g., default or custom) are grafted to the nodes of the query tree. Thereafter, the query tree can be transformed into an execution plan, which can be a relational query expression (e.g., in SQL). Furthermore, the query expression component can be expanded here at compile time utilizing expansion component 780 described infra. The query plan or relational query expression can then be provided to the optimizer component 750. The optimizer component 750 is a part of the database management system. Optimizer component 750 can then optimize the query plan based at least in part on the structure and statistics exposed through all objects in the index 760 utilizing decomptable and keyword-table constructs (described in detail infra), for example. In particular, the decomptable construct can expose appropriate cardinality and histogram statistics depending on the scope of the decomptable, thereby enabling the optimizer component 750 to optimize the whole query globally, unlike conventional query processing models where text portions are optimized locally without considering any cost impact across text and non-text (e.g., relational) components. The optimized expression can be provided to the execution engine component 770 which can correspond to a database management system query processor. Execution engine component 770 can execute the provided expression and utilizing the index 760 can produce results listed in order of relevancy in accordance with the ranking function.

Additionally, prior to execution of the expression by the execution engine component 770, such expression can be provided to expansion component 780. Expansion component 780 can receive the query expression and expand or replace search term(s) with more appropriate or productive terms. For instance, search terms can be expanded to include inflectional forms (e.g., run, runs, running). Similarly stemming can be employed to determine other forms of search term (e.g., run, ran). A thesaurus can also be utilized by the expansion component 780 to provide additional terms with the same or similar meanings. Still further yet, the expansion component can expand key terms that include wild card characters (e.g., *, ?, . . . ) to alternate forms (e.g., histo*, history, historian, historians, historical . . . ). It should be appreciated that the applied expansions or can be dictated by a third party developer linguistics components. This is advantageous at least because the applied expansions can be known and altered unlike conventional black box search engines which apply unidentified expansions to keyword terms to produce results that are often unexpected by a user. Ultimately, expanded or otherwise altered search terms can be provided for execution to the execution engine component 770. Execution engine component 770 can then generate a result set based on the expanded key terms.

Figure 8:
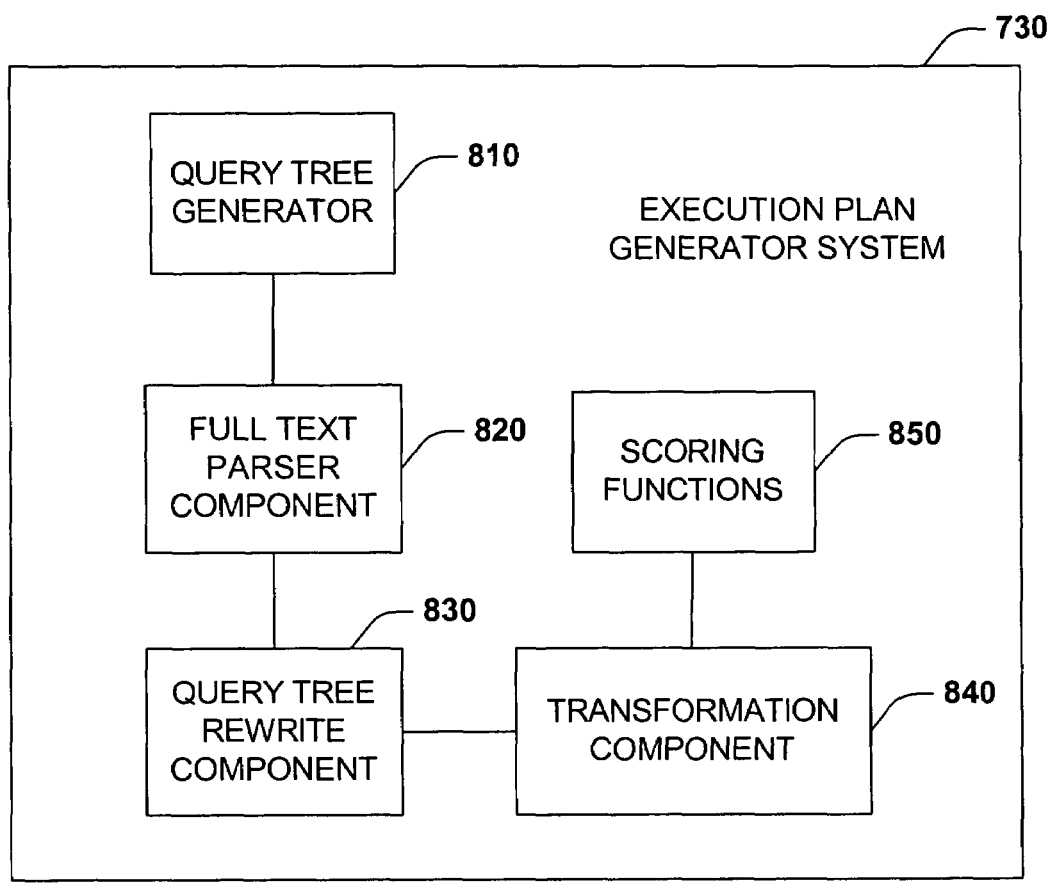
FIG. 8 is a schematic block diagram of an execution plan generator component in accordance with an aspect of the present invention.

FIG. 8 depicts an execution plan generator system 730 in accordance with an aspect of the subject invention. Execution plan generator system can comprise a query tree generator component 810, a full text parser component 820, a query tree rewrite component 830, a transformation component 840, and scoring functions 850. Query tree generator component 810 generates a query tree based on token information provided from an initial query parse (e.g., parse component 720 (FIG. 7)). The full-text parser component 820 can be utilized to parse all the relational terms (e.g., and, or, not . . . ) from the initial tree structure. The query tree rewrite component 830 can rebuild a query tree so that keywords appear as leaf nodes and the relational terms appear as parent nodes to the keyword leaf nodes. Transformation component 840 can receive scoring functions 850 (e.g., from ranking plug-in) and a query tree. Transformation component 840 can transform a query tree into a relational query tree with score functions grafted to keyword leaf nodes. The transformation component 840 can then utilize this relational tree to produce an index relational query expression that can be executed by a database management system query processor engine. The query expansion phase may also be executed before query optimization, if possible, thereby potentially providing more complete information for optimizer to work on and optimize the SQL query.

Figure 9:
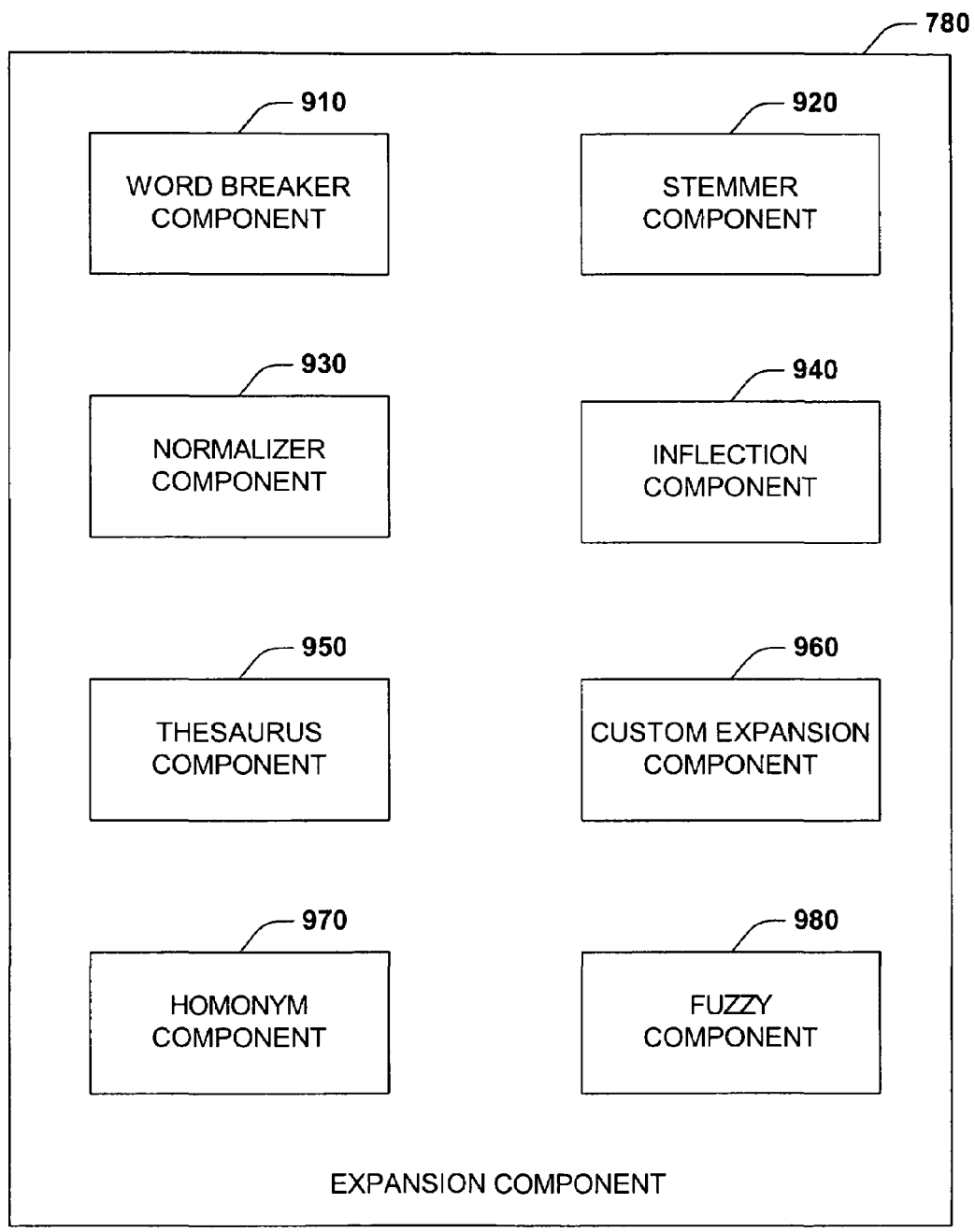
FIG. 9 is a schematic block diagram of an expansion component in accordance with an aspect of the present invention.

FIG. 9 illustrates an expansion component 780 in accordance with an aspect of the present invention. Expansion component 780 receives a query string from a query execution engine, for example, and modifies the string. Expansion component 780 can comprise a word breaker component 910, a stemmer component 920, a normalizer component 930, an inflection component 940, a thesaurus component 950, zero or more custom expansion components 960, homonym component 970, and fuzzy component 980. Word breaker component can break up a provided query string into keywords. The keywords can then be operated on to produce more keywords or delete keywords of de minimus search value. Stemmer component 780 can receive a keyword and generate alternate forms thereof from the word's stem (e.g. run→ran). Normalizer component 930 can normalize a keyword for case and diacritical marks prior to indexing. For instance, the normalizer component 930 can strip all words of accents (e.g., café→cafe). Inflection component 940 can generate inflectional forms of key words (e.g., run→runs, running). Thesaurus component 950 can produce keywords with the same or similar meaning (e.g., movie→film). Expansion component 780 can also include homonym component 970. Homonym component 970 can generate additional keywords based at least in part upon what a provided keyword sounds like when pronounced in a particular language (e.g., flower-flour, prophet-profit, peel-peal, idle-idol, heard-herd, verses-versus . . . ). The homonym component can also consider the context of the keyword amongst other keywords in a query to determine if an alternative spelling of the word is appropriate. Furthermore, a fuzzy component 980 can be included in the expansion component 780 to determine a search keyword that most closely resembles the provided keyword. For instance, if "fulltext" was entered as a keyword then the fuzzy component could generate additional keywords such as "full-text" and "full text." The fuzzy component can also be utilized to generate correctly spelled keywords. For example if a user enters a search for "Arnold Swartzenager" the fuzzy component could substitute the misspelled term for the correctly spelled term "Schwarzenegger." There can additionally be other custom expansion components 960, which transform a query into a set of terms.

According to an aspect of the present invention, the functionality of expansion component 780 via its components can be specified by a third party code. Hence, what has been described above represents only a subset of exemplary functionality and components to provide such. In addition, since expansion functionality can be specified by third parties, the expansion component 780 can be executed as a separate process from the other query generation components so as to isolate other managed query components from unreliable third party code.

Figure 10:
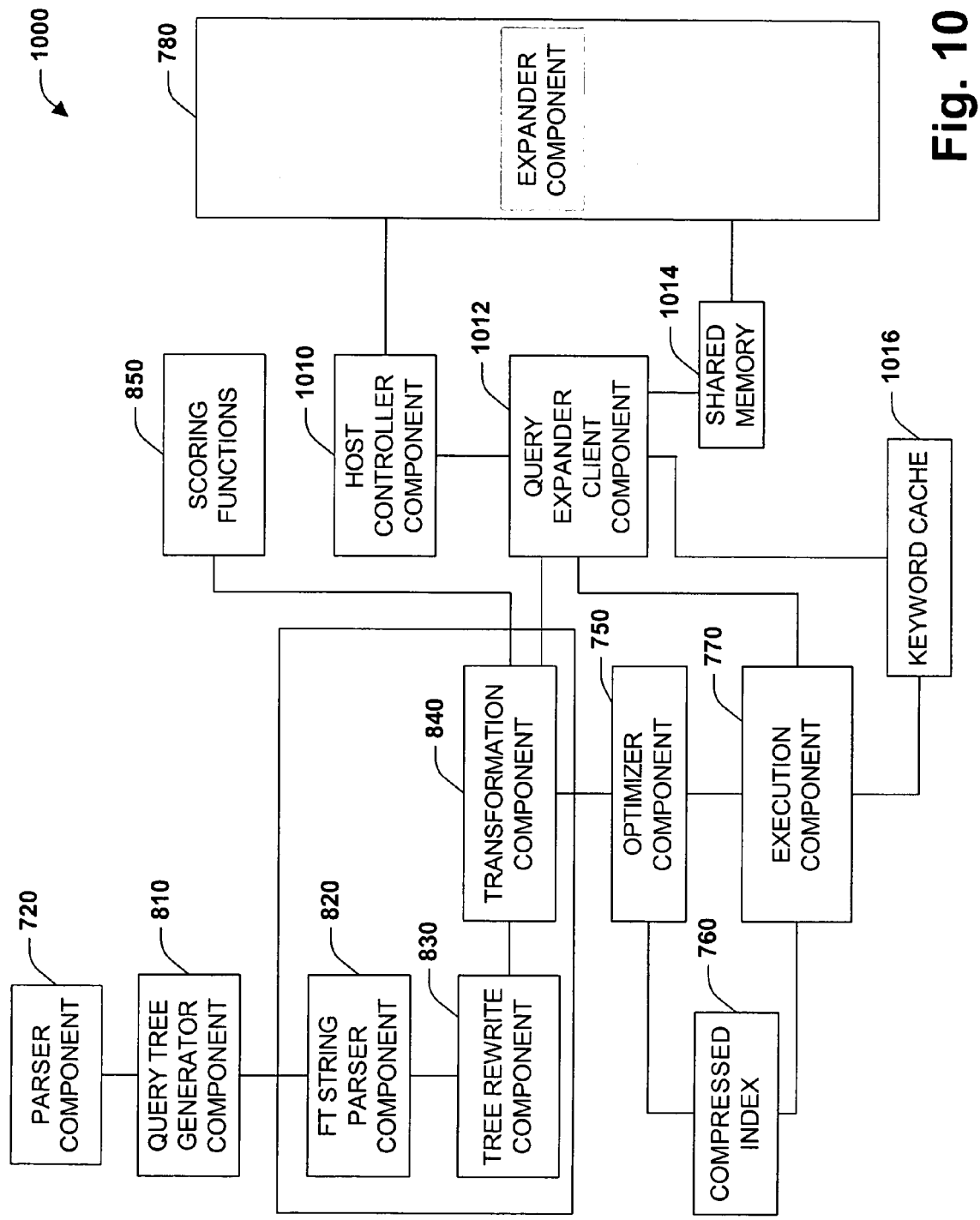
FIG. 10 is a schematic block diagram of a query processing system in accordance with an aspect of the subject invention.

FIG. 10 is a schematic block diagram illustrating a query processing system 1000 in accordance with the present invention. The query processing system comprises a parser component 720. The parser component receives a query string and parses the string into a plurality of tokens. The parsed string is passed to and received by the query tree generator component 810. The generator component 810 utilizes the parsed data to produce a query tree. Full-text string parser component 820 provides further parsing of the query identifying relational tokens such as "and" and "or," among other things. Tree rewrite component can rebuild the query tree to include the relational tokens as the parent of two or more keyword tokens. Transformation component 840 receives the query tree and utilizes the tree and the scoring function 850 to build a relational query. The scoring function 850 provides a default relevance algorithm or a customized developer algorithm for a specific domain. Optimizer component 750 receives the index query as well as statistics regarding the index 760 and modifies the query to increase the speed and efficiency of the query (e.g., reordering and/or aggregating operations). The optimizer component is a common database management system component. The optimized query can then be passed to execution engine component 770 for execution. The query can be executed at that time or alternatively the query can be expanded first. Query expander client component 1012 can receive the index query string from the execution engine component 770. Subsequently, the expander client component 1012 can check to determine whether an expanded query is located in the keyword cache 1016. Keyword cache 1016 provides a very fast memory that the execution engine component 770 can utilize. If the expanded query is located in the keyword cache the execution engine component 770 can simply retrieve the expanded query from the cache. Alternatively, the query expander component 1012 can provided the query to the host controller component 1010 via the keyword cache 1016. The host controller component 1010 can be utilized to manage the operations of an external expander process executed by expander component 780. Expander component 780 can provide various linguistic manipulations of the provided query as specified by a developer. For example, a developer can provide a word breaker component, a normalizer component, a thesaurus component, and an inflection component to name but a few for purposes of illustration and not limitation. After a query is expanded, the expansion component can provide the expanded expression to a shared memory 1014. The query expander client component 1012 can retrieve the expression from the shared memory 1014 and load it into keyword cache 1016, which can be utilized by execution engine component 770 to query the compressed index 760.

The following provides descriptions and examples of several aspects of the subject invention. Furthermore, numerous components are described to illustrate exemplary constructs that can be employed to tightly integrate full-text queries with database management systems. It should be appreciated that the described examples and constructs are provided for purposes of clarity and are not meant to limit the scope of the present invention in any manner. Upon reading and understanding the disclosure provided by this specification, various additional and alternative aspects of the present invention will become apparent to those of skill in the art. Such additional and alternative aspects are to be considered within the spirit and scope of the subject invention.

A default or out of box index schema(s) can be provided according to an aspect of the present invention. However, a developer is free to define one or more customized index schemas. For instance, a developer can define index schemas as a nested relation such as:

```
MyCompRelation(
    Term: varbinary (132),
    Propid: int,
    (
        Docid: bigint,
        IndexTimeRank: int,
        (
            Occurrence: int,
            Occwt: smallint,
        )
    )
)
```

In the above provided example, the nested relation has top level columns (Term, Propid), where Term is a key term in a document and Propid is an identifier indicating the property of the document where the term is found (e.g., Title-1, Abstract-2 . . . ). Each (Term, Propid) is associated with a set of documents where they are found. Each document is indicated with an identifier (referred to henceforth as Docid). Within each such Docid the actual word occurrences can be indicated by an occurrence field. Thus, in the nesting order, (Term, Propid) belongs to top level (level 0), Docid belongs the next level, level 1 (a set of Docids for every (Term, Propid) pair) and occurrence belongs to level 2 (a set of occurrences for each a given Docid for a given pair of (Term, Propid)). IndexTimeRank is another field at the same level as Docid which corresponds to some rank data generated per Docid per (Term, Propid) pair at the time of building index data. A unique compressed index can be created on this relation with the keys as (Term, Propid, Docid, Occurrence). IndexTimeRank is not part of the index key, but is part of the index data (e.g., a pagerank . . . ) in order to possibly impact rank of a document. Similarly, Occwt can be a weight field per occurrence (based on font, capitalization etc.) which may impact the rank, but does not belong to the key of the index. A compressed index may be unique or non-unique. All the columns at levels greater than zero can be compressed utilizing one of many types of known compression algorithms (e.g., delta compression, bit-wise compression, byte-aligned compression . . . ). Furthermore, it should be appreciated that one can employ different combinations of compression algorithms in order to achieve the desired compression of fields.

The schema of a compressed index such as the one described supra can be described by a template (e.g., a reusable schema) which describes the columns, nesting levels, index type, and index columns. Subsequently the compressed index can be exposed to a database developer employing a SQL (Structured Query Language) syntax like a special table-valued function. For example, the syntax can be: Decomptable(<compindexschema., <compressindexname>, (scope-list)), where compindexchema is the name of the schema of the compressed index, where compindexname is the name of the compressed index (which can be a variable), and where scope list is a list of columns of the compressed index which are required from the compressed index. It is important to note that the list of columns in the scope can determine the viewed cardinality of the table returned by the decomptable function. The decomptable function can produce a tabular view of the compressed index comprising columns specified in the scope list and an un-nested view of the levels included by the columns in the scope-list.

For purposes of clarity and not limitation, assume that there is a compressed index instance utilizing the schema describe above as follows:

| Term | PropId | DocId | IndexTime Rank | Occurrence |
|---|---|---|---|---|
| Document | 12 | 1 | 3 | 2 |
|  |  |  |  | 5 |
|  |  | 4 | 2 | 1 |
|  |  |  |  | 20 |
| Processing | 10 | 1 | 4 | 4 |
|  |  |  |  | 45 |
|  |  | 5 | 2 | 50 |
|  |  |  |  | 60 |
|  |  |  |  | 100 |

The table-valued function decomptable will yield different results according to the specified scope-list. For example:

A.    Scope-list: (Term, Propid)
       Result:
       Document     12
       Processing     10
B.    Scope-list: (Term, Propid, Docid, IndexTimeRank)

-continued

|   | Result: | | | | |
|---|---|---|---|---|---|
|   | Document | 12 | 1 | 3 | |
|   | Document | 12 | 4 | 2 | |
|   | Processing | 10 | 1 | 4 | |
|   | Processing | 10 | 5 | 2 | |
| C. | Scope-list: (Term, Propid, Docid, IndexTimeRank) | | | | |
|   | Result: | | | | |
|   | Document | 12 | 1 | 3 | 2 |
|   | Document | 12 | 1 | 3 | 5 |
|   | Document | 12 | 4 | 2 | 1 |
|   | Document | 12 | 4 | 2 | 20 |
|   | Processing | 10 | 1 | 4 | 4 |
|   | Processing | 10 | 1 | 4 | 45 |
|   | Processing | 10 | 5 | 2 | 50 |
|   | Processing | 10 | 5 | 2 | 60 |
|   | Processing | 10 | 5 | 2 | 100 |

With this construct one can now use the function in the FROM clause of any SQL query the way one would use a table-valued function. Thus, a query can be written such as:

Select * from decomptable(mycomptemplate, @mycompindex, (term, propid, docid)) a Where a.term="Document"

Another significant construct provided by the present invention is Keywordtable( ) which is another table-valued function which exposes basic linguistic functions like language sensitive word-breaking, stemming, thesaurus and the like to transact SQL. The generic syntax of keywordtable is Keywordtable(<string>, <languageinfo>), where the first parameter is a string that expresses in a string language the linguistic processing required, and the second parameter <languageinfo> defines the language to be employed for the linguistic processing. A simple example is Select * from keywordtable("'Document Processing'", US_English), which can wordbreak the phrase 'Document Processing' using the US_English word breaker. A portion of a result table can include:

| PhraseId | AltId | Occurrence | Term | ExpansionType |
|---|---|---|---|---|
| 1 | 1 | 1 | Document | Wordbreak |
| 1 | 1 | 2 | Processing | Wordbreak |

The keywordtable function can also be utilized to return inflectional forms of keywords. For example, Select * from keywordtable("Inflectional forms of run', US_English) can return:

| PhraseId | AltId | Occurrence | Term | ExpansionType |
|---|---|---|---|---|
| 1 | 1 | 1 | run | Wordbreak |
| 1 | 2 | 1 | runs | Inflect |
| 1 | 3 | 1 | running | Inflect |

BindfullTextObject is yet another construct that can be utilized by a developer in order to facilitate interaction with a customized index schema. BindfullTextObject binds to a dependent object that is defined as part of full-text schema, which belongs to the specified full-text index, and returns data for the given scope. A full-text index can have a number of dependant objects defined as part of its schema. One of these dependent objects could be a table mapping docid's to keys. Another could be the compressed relation that is part of the full-text index. The columns specified in the scope list can be referenced in the project list for BindFullTextObect. Accordingly, the type of object that may be retrieved by the BindFullTextObject construct can include at least a table or a compressed relation. BindFullTextObject can be employed in any place a table valued function can be used; most commonly, in the FROM clause of a Select statement or as part of a JOIN. BindFullTextObject can be specified as BindFullTextObject(<fulltext index schema>,<fulltext index name>,<dependent object name>, [<scope list>]). Fulltext index schema refers to the full text index schema that specifies what dependent objects exist for the full text index. Full text index name specifies the name of the full text index. Dependent object name specifies the name of the dependent object to bind to. Scope list defines the column or columns of the dependent object to return. All columns can be returned if * is specified or if scope list is not specified. The following is provided as an example of the use of BindFullTextObject.

SELECT B.docId FROM
  KeyWordTable("'gumption'", US_English)
  INNER JOIN BindFullTextObject(FtIdxSchema, myFtIdx, ftIdxCompRel,
    (keyword, colid, pid, docid)) B
  ON k.normalizedKeyword=B.keyword This database expression returns docids from the compressed relation (ftIdxCompRel) that is part of the full text index (myFtIdx), where the keyword is 'gumption'.

Utilizing the table-valued functions of decomptable and keywordtable as well as BindFullTextObject, a developer can express text-processing related functions like ranking functions utilizing transact SQL as well as all tools available to server users. This facilitates providing the openness of the architecture of the present invention and integration with the core database query processor or engine.

Figure 11:
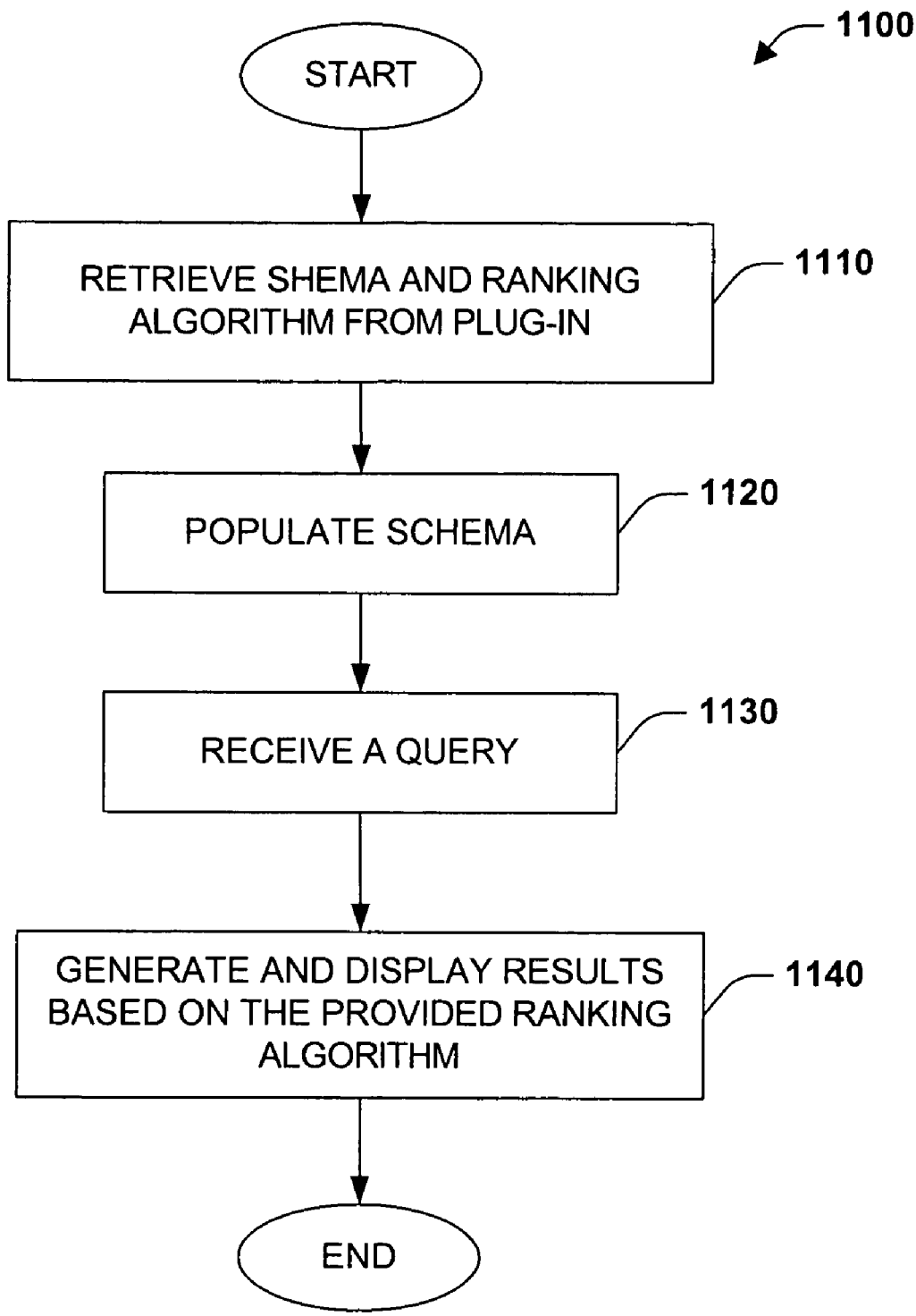
FIG. 11 is a flow chart diagram of a method of employing a customized full-text query in accordance with an aspect of the present invention.
Figure 12:
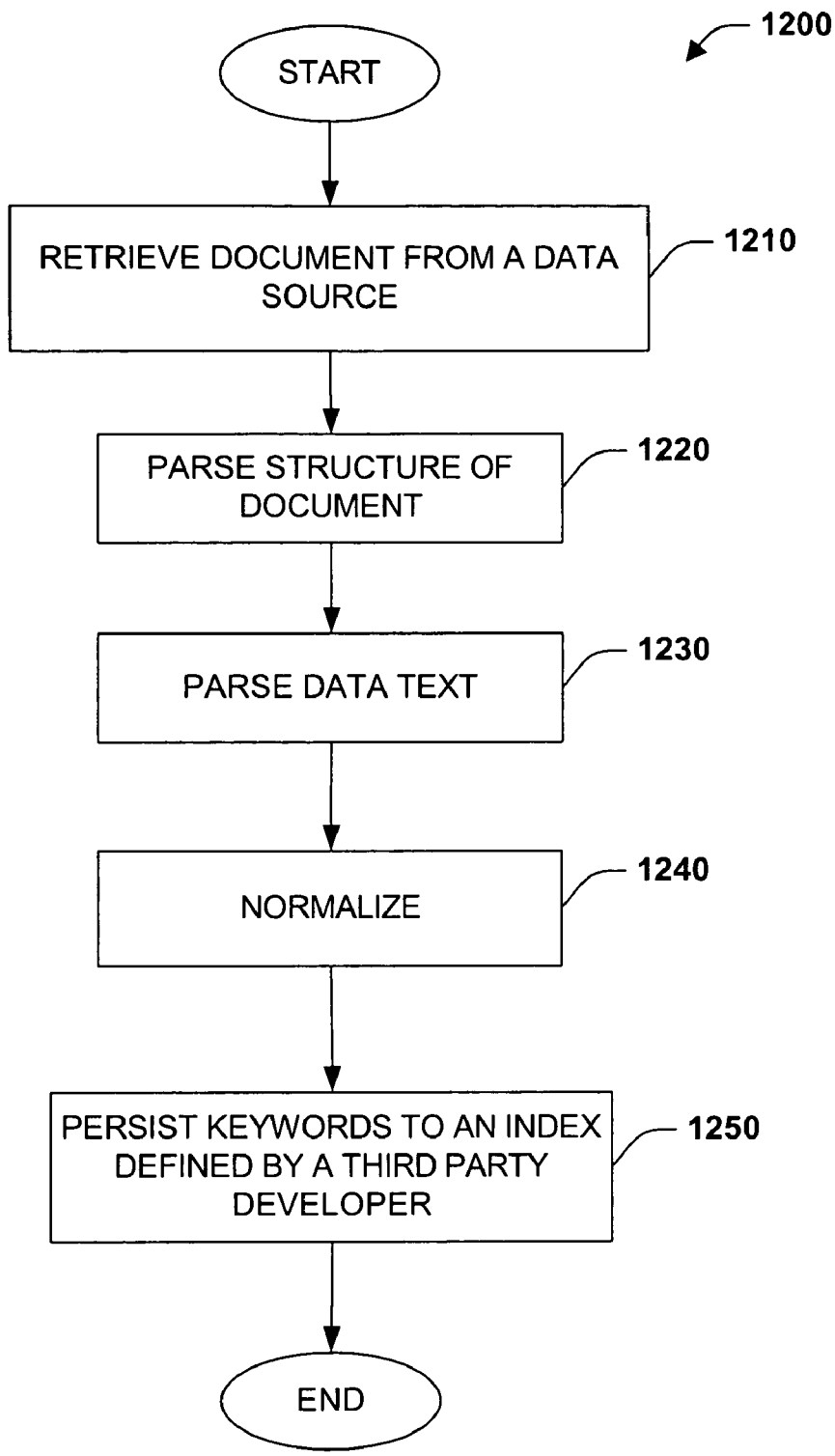
FIG. 12 is a flow chart diagram illustrating an indexing methodology in accordance with an aspect of the subject invention.
Figure 13:
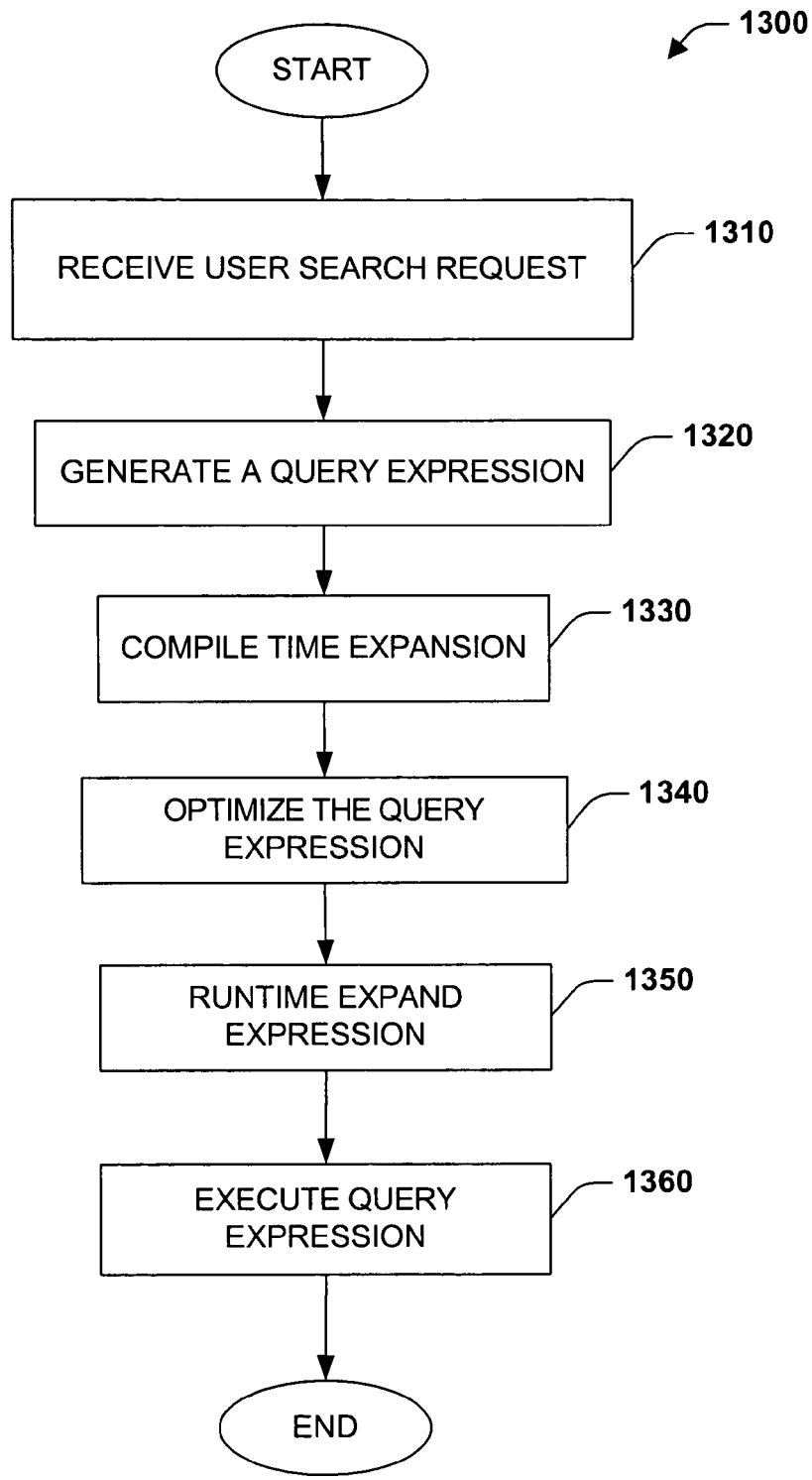
FIG. 13 is a flow chart diagram of an integrated full-text search methodology in accordance with an aspect of the present invention.

In view of the exemplary system(s) described supra, a methodology that may be implemented in accordance with the present invention will be better appreciated with reference to the flow charts of FIGS. 11-13. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media. By way of illustration and not limitation, the article of manufacture can embody computer readable instructions, data structures, schemas, program modules, and the like.

FIG. 11 depicts a methodology 1100 for employing a customized full-text query in accordance with an aspect of the subject invention. At 1110, an index schema and ranking algorithm can be retrieved from a plug-in component. The plug-in component can be provided to the system by a third party developer. A third party developer can be an independent search provider that develops customized index schemas rankings for particular information domains (e.g., medicine, law, geology, product catalogs, finance, customer information . . . ) that can be utilized by a search architecture that is tightly integrated with a database management system (e.g., SQL Server). At 1120, the index is populated. The index can be populated with document information residing on local or external servers. Index population can be a continuous process to account for newly added or created documents. Once the index is substantially populated, a query can be received from a user, at 1130. Thereafter, at 1140, query results can be generated utilizing a core database processor or engine. The results can then be displayed in order of rank as specified by the ranking algorithm, for example from most relevant document to least relevant document.

Turning to FIG. 12, an indexing methodology 1200 is depicted in accordance with an aspect of the subject invention. At 1210, a document is retrieved from a data source. For example, documents can be retrieved from a local database or external database. Documents can include but are not limited to character strings, tables, text files, program files, schemas, multimedia files, web pages, links and the like (e.g., Word, Excel, PDF, HTML, XML . . . ). At 1220, the document structure can be parsed. More specifically, documents can be filtered so as to remove structural or formatting data provided by a document and emit chunks of text. Additionally, it should be appreciated that during this initial parsing the language associated with each text chunk (e.g., English, French, Russian . . . ) can be identified and noted in a language id. At 1230, the provided text chunks can be further parsed and tokens generated for each language grammar element (e.g., keywords . . . ). The location of keywords in a document (e.g., first word, second word, byte offset . . . ) can also be identified at this point. Furthermore, noise words or words with little value as search criteria (e.g., a, an, the . . . ) can also be removed. Subsequently, at 1240, a document can be normalized for case and diacritical marks prior to indexing. For instance, if a developer does not want a query to be accent sensitive, keywords can be stripped of accents (e.g., café becomes cafe). At 1250, the keywords and associated metadata are persisted to an index defined by a third party developer. For example, the index can be an inverted compressed index arranged according to one of a myriad of differing index schemas specified by a developer.

FIG. 13 illustrates an integrated full-text search methodology in accordance with an aspect of the present invention. At 1310, a search request or query is received. The query can be received from an end user employing a graphical user interface (GUI), for instance. Thereafter, a query expression is generated corresponding to the received query at 1320. The query expression can correspond to a structured database query. According to one aspect of the invention, the query expression can be generated by parsing the provided end-user query, building a query tree, and utilizing the query tree to create a structured query expression. In addition to keywords and relations there between, the query expression can also include a ranking function defined by and provided to the subject query system by a third party search developer, perhaps focused on a particular environment or scenario. At 1330, the generated query expression can be expanded here at compile time. At 1340, the expanded query expression can be optimized utilizing a database query optimizer. At 1350, the query expression can be expanded or otherwise modified again at runtime. For example, the query expression can be normalized or altered to include additional keywords corresponding to inflection forms, homonyms, or keywords with the same meanings. It should be appreciated that such linguistic processing can be provided by developer specified code components. Such components are often not as reliable as database management system components. Hence, such linguistic processing can be transferred out of the database management system and executed as a daemon process for purposes of safe and reliable query processing. This external process can then be managed by the system utilizing an external host controller component. Finally, at 1360, the query expression can be executed on an index utilizing a core database query engine or processor. The results can subsequently be presented in order of their relevancy as specified by the ranking algorithm.

Figure 14:
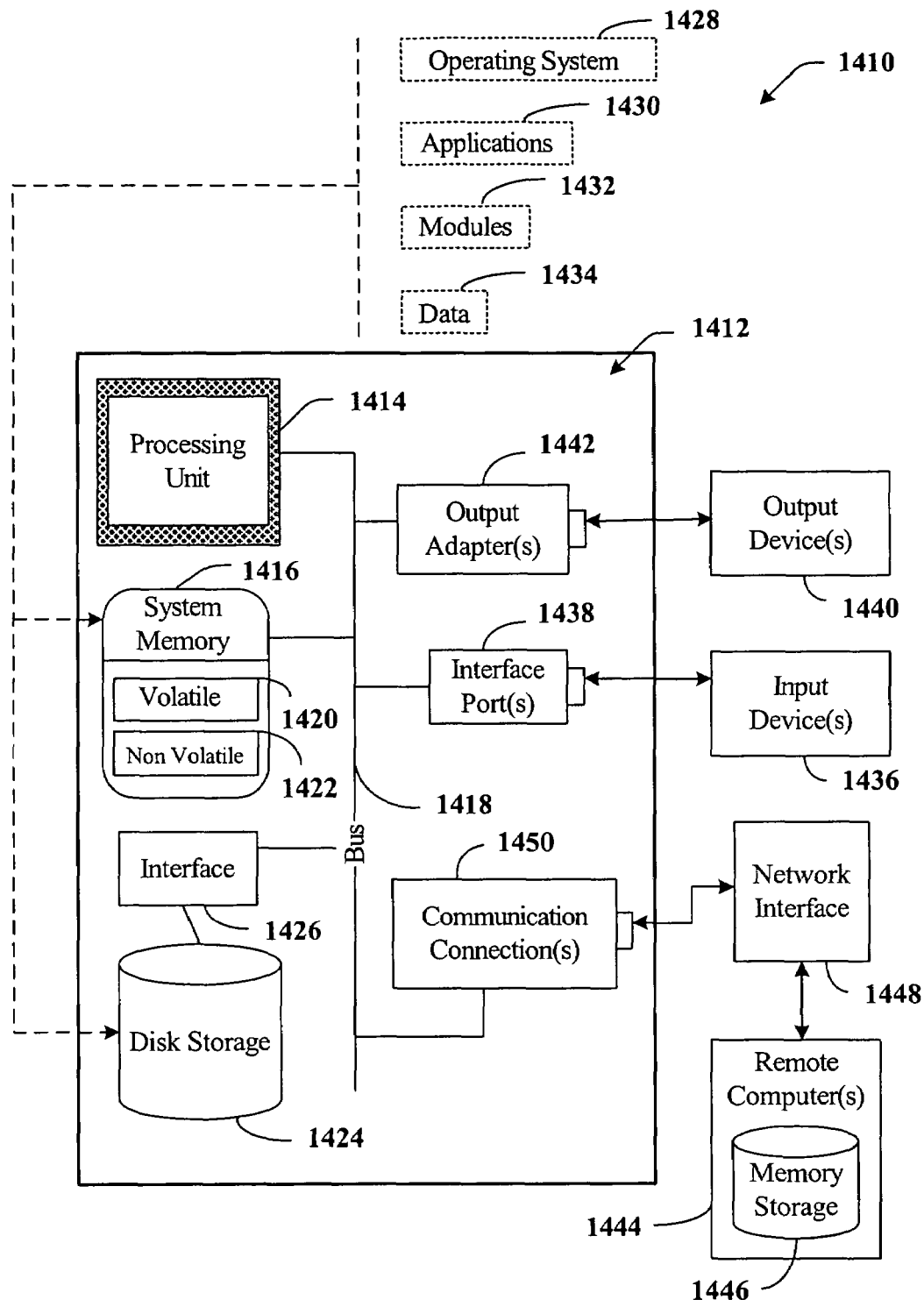
FIG. 14 is a schematic block diagram illustrating a suitable operating environment in accordance with an aspect of the present invention.
Figure 15:
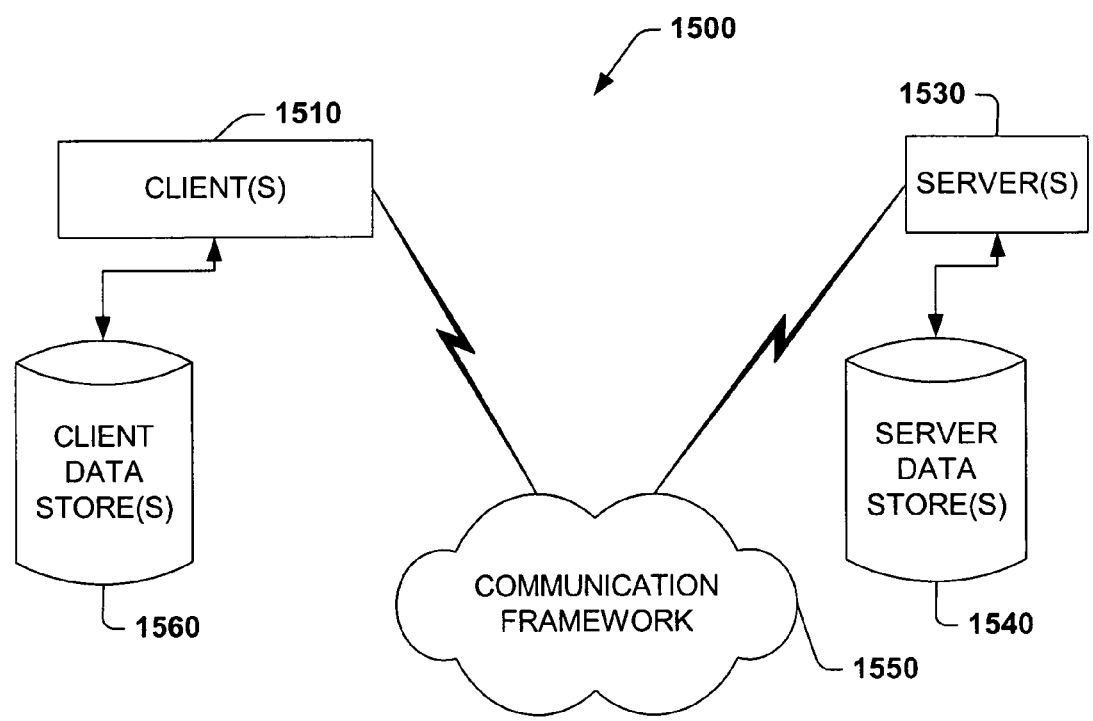
FIG. 15 is a schematic block diagram of a sample-computing environment with which the present invention can interact.

In order to provide a context for the various aspects of the invention, FIGS. 14 and 15 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, handheld computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 14, an exemplary environment 1410 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example disk storage 1424. Disk storage 4124 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. Furthermore, it is to be appreciated that the present invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, touch screen, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412 and to output information from computer 1412 to an output device 1440. Output adapter 1442 is provided to illustrate that there are some output devices 1440 like monitors, speakers, and printers, among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems, DSL modems, power modems, ISDN adapters, and Ethernet cards.

FIG. 15 is a schematic block diagram of a sample-computing environment 1500 with which the present invention can interact. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The servers 1530 can house threads to perform transformations by employing the present invention, for example. One possible communication between a client 1510 and a server 1530 may be in the form of a data packet adapted to be transmitted between two or more computer processes. The system 1500 includes a communication framework 1550 that can be employed to facilitate communications between the client(s) 1510 and the server(s) 1530. The client(s) 1510 are operably connected to one or more client data store(s) 1560 that can be employed to store information local to the client(s) 1510. Similarly, the server(s) 1530 are operably connected to one or more server data store(s) 1540 that can be employed to store information local to the servers 1530.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes or having" is used in either the detailed description or the claims, such term is intended to be inclusive in a manner similar to the term "comprising" as "comprising" is interpreted when employed as a transitional word in a claim.

What is claimed is:

1. A full-text search computer implemented system comprising:

a plug-in component executed on a computer provided by a third party developer that defines a relevant score algorithm and a full-text index schema, wherein the relevance algorithm facilitates ranking matching documents and providing a list of documents in order of their relevance; and a search component to receive and utilize the plug-in component to query data from a data store, populate an index in accordance with the provided index schema and utilize the index to generate a list of matching documents in order of their relevance as specified by the relevant score algorithm, the query data is modified by one or more components specified by the third party developer;

wherein the third party developer specified components are executed as separate daemon processes managed by an external host controller component from within a database management system.

2. The system of claim 1, wherein the plug-in component specifies how the schema is to be populated.

3. The system of claim 1, wherein the search component is tightly integrated into a database management system.

4. The system of claim 3, wherein the database management system comprises a query execution engine that executes received full-text queries and database queries.

5. The system of claim 4, wherein the full-text queries are optimized by a database management system optimization component.

6. The system of claim 1, wherein the search component comprises an index system that creates an index in accordance with one or more consumer plug-in components and a query processing system that provides a mechanism for retrieving relevant documents utilizing the index.

7. The system of claim 6, wherein the index is a compressed nested data structure.

8. A full-text indexing computer implemented system comprising:
a gatherer component to retrieve a document from a data store;
a producer pipeline component that parses the structure and text of the retrieved document in accordance with a plurality of third party developer specified components; and
a consumer pipeline component that receives data from the producer pipeline component and persists data to an inverted index, upon receipt of data, the consumer pipeline component consumes the data and takes action via executing a message through transacted message queues;
the inverted index is modified by the third party developer specified components wherein the third party developer specified components are executed as separate daemon processes managed by an external host controller component from within a database management system.

9. The system of claim 8, wherein the gather component and the consumer pipeline component reside within a database management system.

10. The system of claim 8, wherein the producer pipeline component comprises a noise component to remove keywords that are diminutive in value as search criteria.

11. The system of claim 8, wherein the gatherer component retrieves documents from external databases.

12. A full text query computer implemented system tightly integrated with a database management system comprising:
a parser component that tokenizes received queries;
an execution plan generation system the generates an execution plan based on tokens received from the parser component and a ranking algorithm provided by a third party developer via a ranking plug-in component, wherein the ranking algorithm ranks documents from most to least relevant;
an execution engine component that utilizes the execution plan to search an index and produce a list of matching documents in order as specified by the ranking agorithm;
the execution plan is modified by the third party developer specified component wherein the third party developer specified component is executed as separate daemon process managed by an external host controller component from within a database management system.

13. The system of claim 12, further comprising a user interface component to receive queries from users.

14. The system of claim 12, wherein execution plan generator component produces a query tree, appends scoring functions to leaves, and transforms the query tree into a data base query expression.

15. The system of claim 14, further comprising an optimizer component that optimizes the database query structure based on information concerning the index to be searched.

16. The system of claim 15, further comprising an expander component that modifies keywords provided in the query structure.

17. The system of claim 16, wherein the expander component is executed as a separate daemon process from the execution engine.

18. The system of claim 17, wherein the expander component includes at least one of a stemmer component, a normalizer component, an inflection component, a thesaurus component, a custom expansion component, a homonym component, and a fuzzy component.

19. The system of claim 18, where the expander components and associated functionality are specified by a third party developer.

20. A computer implemented method of employing a customized full-text query comprising:
retrieving a full-text indexing schema and ranking algorithm from a plug-in component provided by a third party developer;
populating an index in accordance with the provided indexing schema;
receiving a query;
generating a list of documents utilizing the index;
displaying the list of documents by ranked in accordance with their relevance by the ranking algorithm, wherein the list of documents are displayed in order from most to least relevant; and
modifying the query by the third party developer specified component wherein the third party developer specified component is executed as separate daemon process managed by an external host controller component from within a database management system.

21. The method of claim 20, wherein the results are generated by a database management system query processor.

22. A customized indexing computer implemented methodology comprising:
retrieving a document from a data source;
removing document formatting data and emitting text chunks;
parsing the text chunks into keywords;
persisting the keywords to an index, the index schema being defined by a third party developer;
employing a ranking algorithm to facilitate ranking matching documents, wherein the ranking algorithm ranks documents from most to least relevant; and displaying a list of documents by rank in accordance with the ranking algorithm; and modifying the index by the third party developer specified component wherein the third party developer specified component is executed as separate daemon process managed by an external host controller component from within a database management system.

23. The method of claim 22, further comprising normalizing keywords.

24. The method of claim 22, further comprising removing keywords of diminutive value as search criteria.

25. The method of claim 22, further comprising identifying the language of each text chunk and generating an id indicative thereof.

26. The method of claim 22, further comprising determining and noting the position of each keyword within a respective document.

27. A full text search computer implemented methodology comprising:

receiving a search request;

generating a query expression in response to the search request which includes a third party developer specified ranking algorithm for determining the relevance of result documents, wherein the ranking algorithm ranks documents form most to least relevant;

modifying the query expression to include, remove, add, or modify keyword terms, wherein the query expression is modified by one or more components specified by a third party developer and the third party developer specified components are executed as separate daemon processes managed by an external host controller component from within a database management system; and displaying a list of documents by rank in accordance with the ranking algorithm.

28. The method of claim 27, further comprising utilizing a database management system to optimize the query expression prior to execution.

29. The method of claim 28, further comprising employing a database execution engine to execute full text queries.

30. The method of claim 27, wherein the query expression is modified once at compile time and again at runtime.

* * * * *